J. J. PORTER.
MACHINE FOR MAKING VESSELS.
APPLICATION FILED APR. 25, 1910.

985,631.

Patented Feb. 28, 1911.

UNITED STATES PATENT OFFICE.

JOHN J. PORTER, OF PEABODY, MASSACHUSETTS, ASSIGNOR OF ONE-FOURTH TO FRANK E. FARNHAM, OF PEABODY, MASSACHUSETTS.

MACHINE FOR MAKING VESSELS.

985,631.  Specification of Letters Patent.  Patented Feb. 28, 1911.

Application filed April 25, 1910. Serial No. 557,465.

*To all whom it may concern:*

Be it known that I, JOHN J. PORTER, a citizen of the United States, residing at Peabody, in the county of Essex and State of Massachusetts, have invented certain new and useful Improvements in Machines for Making Vessels, of which the following is a specification.

My invention relates to an improvement in machines for making pots and vessels, and the object is to provide means for forming the vessel from a ball of clay, both exteriorly and interiorly, in a single piece.

The invention consists in certain novel features of construction and combinations of parts which will be hereinafter fully described and pointed out in the claims.

Figure 1:
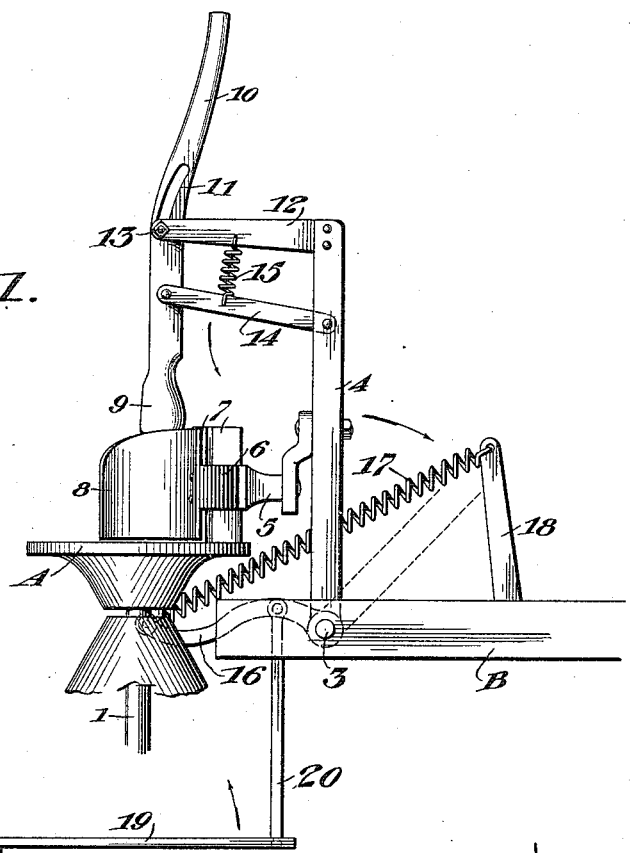
Figure 2:
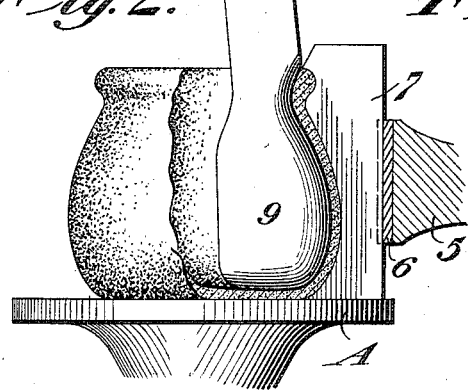
Figure 3:
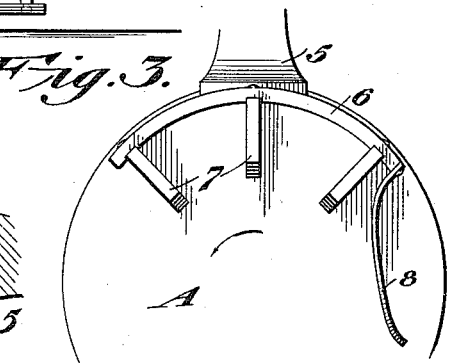

In the accompanying drawings:—Figure 1 is a view in elevation; Fig. 2 is a detail view showing the inside former and one of the outside formers; and Fig. 3 is a top plan view of the potter's wheel and the outside formers and ball truer.

A represents the potter's table, which is mounted upon a shaft 1 which is adapted to be rotated at any desired speed by any approved means, not shown. A bar or frame B has a shaft 3 mounted thereon, upon which is mounted an upright 4. A head 5 is removably connected to the upright, and connected to the head is a curved member 6, to which are connected the formers 7, 7, which can be constructed of any suitable shape, and as many formers as necessary, mounted upon the member 6. Connected to one end of the former is a plate 8, which is termed a "ball truer". The internal former 9 is provided with a handle or bar 10, which is provided with a curved slot 11. An arm 12, connected to the upright 4, is connected to the bar 10 by means of a bolt 13 which passes through the slot, permitting the bar 10 to have a vertical movement. A lever 14 is pivotally connected to the upright 4 and the bar 10, and connecting the lever 14 and the arm 12 is a coil spring 15, which tends to draw the bar 10 upward so that in the act of forming the pot or vessel, it is necessary to gradually force the bar down, to cause the formation of the bean pots or vessels. An arm 16 is connected to the shaft 3, and connected to the end of the arm 16 is a spring 17 which is connected to a standard 18 mounted on the frame B. This spring normally tends to draw the arm 16 upward for causing the rotation of the shaft 3, whereby the upright 4 is swung downward, causing the former 9 to be drawn away from the potter wheel. A treadle 19 is connected to the arm 16 by a link 20. Upon pressing the treadle 19 downward, the arm 16 is caused to be drawn down, bringing the upright 4 to an upright position, whereby the formers 7 are brought into position over the potter wheel for the formation of the external surface of the vessel, and the internal former is brought to a position whereby it can be lowered for forming the interior surface of the vessel. Upon the release of the treadle 19, the spring 17 will draw the arm 16 upward, causing the shaft to be rotated, which will move the upright 4, swinging it downward, and withdrawing the internal former away from the treadle. Immediately upon the release of the internal former, the spring 15 will cause the internal former to move upward.

From the foregoing, it will be seen that after the ball of clay or material which is to be used in the formation of the vessel has been placed upon the wheel, and the formers have been brought into position, the wheel can be rotated, and the vessel formed by the gradual downward movement of the internal former, and the ball truer 8 will cause the ball of clay or material, to be pressed or forced into position, whereby the material will receive the proper action from the external formers, as well as the internal former, in spreading the material outward for forming the interior surface.

Having fully described my invention, what I claim as new and desire to secure by Letters Patent, is:—

1. In a machine for making vessels, the combination with a potter's wheel, of a support, an internal former, a lever pivotally connected to the support and connected to the former, said lever carrying the former as it is moved into position for forming the article and means connected to the lever for normally holding the former away from the wheel.

2. In a machine for making vessels, the combination with a potter's wheel, of a support and a former, a lever pivotally connected to said support and said former, and means on the support for guiding the former into position and as it is moved toward the wheel for forming the article.

3. In a machine for making vessels, the combination with a potter's wheel, and a shaft, of an upright mounted on the shaft, external and internal formers mounted on the upright, means for operating the shaft for oscillating the upright for causing the formers to be moved from a horizontal to a vertical position, and means for causing the formers to be brought together for forming the article.

4. In a machine for making vessels, the combination with a potter's wheel, and a shaft, of an upright mounted on the shaft, a former pivotally mounted on the upright, and means for operating the shaft for oscillating the upright for causing the former to be brought from a horizontal to a vertical position, whereby the former can be moved toward the wheel for forming the article.

5. In a machine for making vessels, the combination with a potter's wheel, of a pivoted support, formers mounted on the support, means for oscillating the support for carrying the formers into a position over the wheel for forming the article, and means for normally holding the formers away from the wheel.

6. In a machine for making vessels, the combination with a potter's wheel, of a pivoted support, formers mounted on the support, means for oscillating the support for moving the formers from a horizontal to a vertical position, and means for normally holding the formers in a horizontal position.

7. In a machine for making vessels, the combination with a potter's wheel, of external and internal formers, and means for causing the internal former to move across the wheel toward the external former, when the internal former is moved into position for forming the article.

In testimony whereof I affix my signature in the presence of two witnesses.

JOHN J. PORTER.

Witnesses:
DANIEL BUXTON,
GUS W. MELVIN.

Copies of this patent may be obtained for five cents each, by addressing the "Commissioner of Patents, Washington, D. C."